3,523,330
APPARATUS FOR BLOW-EXTRUSION AND FILLING HOLLOW BODIES

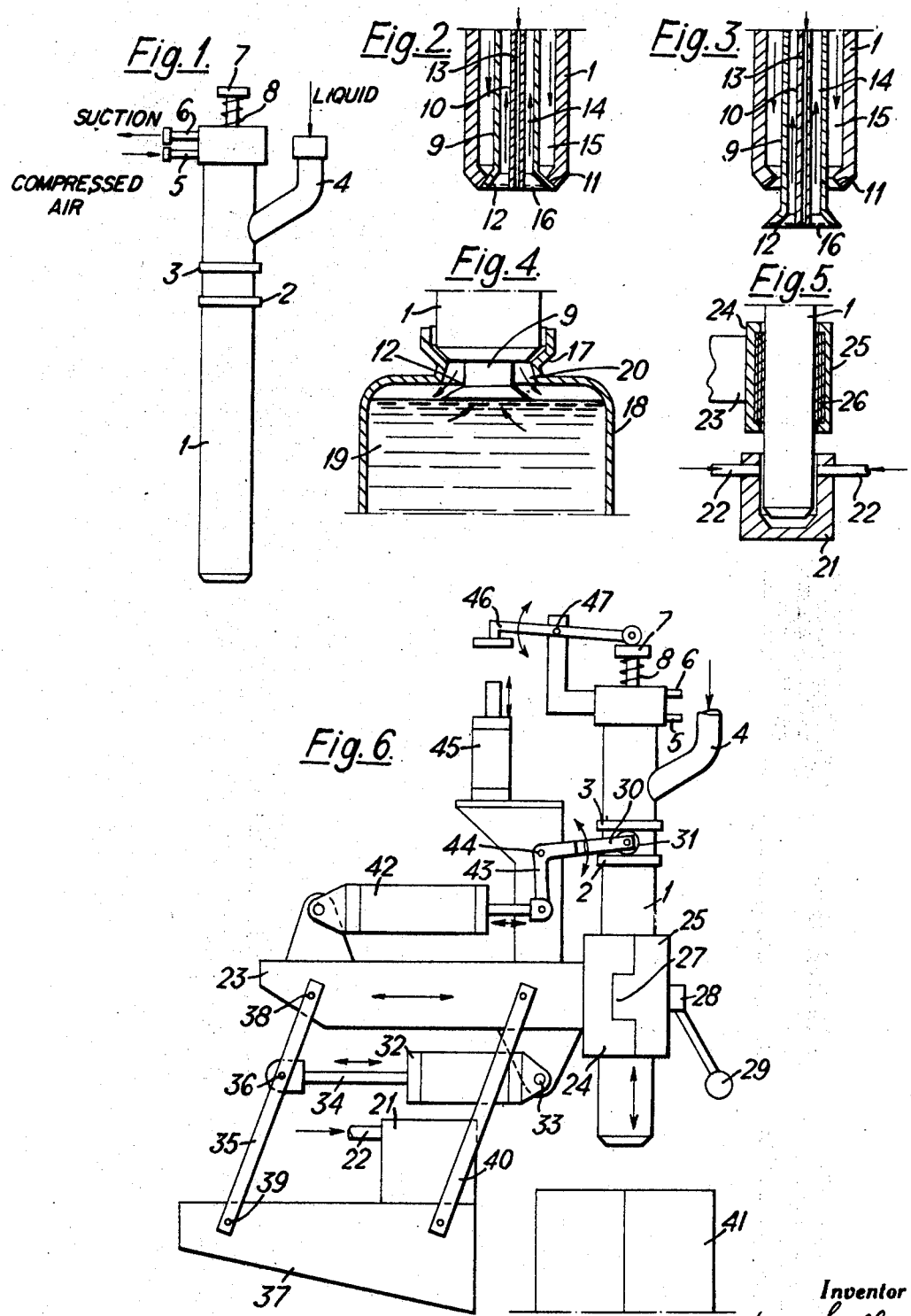

Pierre-Henri Gallay, Neuilly, France, assignor to Mecaplast S.A., Geneva, Switzerland, a Swiss body corporate
Filed Sept. 21, 1967, Ser. No. 669,456
Claims priority, application France, Sept. 22, 1966, 77,262
Int. Cl. B29c 17/07; B29d 23/03; B65b 47/08
U.S. Cl. 18—5                              9 Claims

ABSTRACT OF THE DISCLOSURE

The disclosure describes a blowing nozzle for use in apparatus for blow-extruding and filling hollow bodies, such nozzle comprising an external tubular body, having an open lower end, an element mounted coaxially within said tubular body and longitudinally divided to form two channels both open at the bottom, means being provided to move said element axially within said tubular body, the tubular element including a seal, for sealing the lower end of the tubular body when said element is in its raised position.

---

In certain processes for the manufacture of hollow bodies by blow-extrusion, the bodies are filled during the actual manufacturing process. In such processes, devices are used which mould the body and cut the neck, and fill the moulded body. The difficulties encountered usually lead to the use of differentiated nozzles which each ensure a particular function. When it is additionally desired to fill the bodies with liquid foods, such as milk, problems as regards hygiene and sterility arise.

According to the invention there is provided a blowing nozzle for use in apparatus for blow-extruding and filling hollow bodies, such nozzle comprising an external tubular body, having an open lower end, an element mounted coaxially within said tubular body and longitudinally divided to form two channels both open at the bottom, means being provided to move said element axially within said tubular body, the tubular element including a seal, for sealing the lower end of the tubular body when said element is in its raised position.

For the sake of simplicity the following description will be limited to the preferred case of two coaxial channels formed by a pair of coaxial tubular elements.

The lower orifice of the external body is preferably frustoconical and the lower end of the outer element of the pair of tubular elements has a conical head, or is conically flared to form a fluid-tight poppet valve.

In principle, the inner element of the pair of elements is connected to a source of blowing air, the annular space contained between the inner and outer elements being connected to a suction means and the annular space between the outer element of the pair of inner elements and the external body is connected to a source of filling liquid.

With the object of avoiding the danger of drops forming at the end of the nozzle, the two tubular elements can be connected by a perforated plate or an annular mesh grid connecting the lower rim of the outer element to the outer rim of the inner element, a slight suction being maintained above said grid.

The invention will be more readily understood from the following description, given merely by way of example, reference being made to the accompanying drawing, in which:

FIG. 1 is an elevation of one embodiment of nozzle according to the invention, shown separated from its support;

FIG. 2 is an axial section of the lower part of the nozzle shown in FIG. 1 and in the closed position;

FIG. 3 is a view similar to that of FIG. 2, but showing the nozzle in the open position;

FIG. 4 is a partial sectional view of a hollow moulded body and of the nozzle during the filling phase;

FIG. 5 is an axial section of the nozzle-supporting sleeve, with the said nozzle inserted into an automatic cleaning cup; and FIG. 6 is a diagrammatic view of the complete arrangement, comprising the members for mounting and controlling the nozzle.

In the example shown in the drawing, the nozzle comprises an external tubular body 1 of corrosion-resistant metal, e.g. stainless steel, and having the smallest possible number of recesses or projections so as to facilitate the cleaning and sterilising thereof. The tubular body 1 carries two shoulders 2 and 3, and has, at its upper end, three fluid supply pipes, namely, a supply pipe 4 for filling liquid, for example milk, a filtered compressed air inlet pipe 5 and a suction pipe 6.

Two concentric tubes 9 and 10 which are secured together are mounted coaxially inside the tubular body 1, the tube 9 being secured to a push-rod 7, which is urged upwardly by a return spring 8. The tubular body 1 has, at its open lower end, a frustoconical orifice 11, having the same conicity as a flared conical head 12, formed on the lower end of the outer element 9, so as to form a fluid-tight poppet valve when the tube 9 slides upwardly inside the tube 1 under the action of the spring 8 to the position shown in FIG. 2.

The three tubes 1, 9 and 10 define between them passages 13, 14 and 15, the passage 13 being connected to pipe 5 for the supply of blowing air, the passage 14 being connected to suction pipe 6 and the passage 15 being connected to supply pipe 4 for admission of the liquid for filling purposes. This latter passage 15 has a large section so as to permit the flow under low pressure or simply by gravity of a considerable volume of liquid in a very short time. The end of the flared conical portion 12 of the element 9 is connected to the element 10 by an annular mesh grid or a plate 16 in which are formed numerous fine holes. The purpose of this grid 16 is to eliminate the danger of drops on the end of the nozzle, by a slight suction being continuously maintained in the passage 14, even during the blowing period.

During the period of filling of the hollow body (FIG. 4) the body of the nozzle 1 bears against the neck 17 of a bottle 18, and the elements 9 and 10 are lowered, the liquid 19 flowing at 20 as indicated by the arrows. The flow of the liquid along the walls of the bottle ensures an efficient cooling of the latter.

When the bottle is full, the valve 12 closes again under the action of the spring 8 acting on the then freed plunger 7 and the nozzle is disengaged from the neck in an upward direction. A continuous suction through the grid 16 then removes the drops from the end of the nozzle, while a very slight blowing action in the tube 13 prevents the upward movement of liquid in the latter and the stray drops which would result therefrom during the blowing. A slight blowing effect is moreover maintained during the filling so as to prevent upward movement of liquid in the tube 13 during this stage.

As may also be seen from FIG. 4, continuous suction through the conical head 12 removes froth as it is formed and permits a clean filling to a level well established by the position of the conical head 12. This obviously presupposes that a quantity of liquid slightly larger than that required for the filling operation is supplied. On completion of the filling operation, the valve 12 automatically closes the nozzle 1.

After filling, the nozzle is transferred mechanically from the neck of the botlte to an automatic cleaning station (FIG. 5), consisting of a cup 21 into which the nozzle is inserted, where it is placed under suction, is flushed with filtered and sterile air or a suitable gas introduced through the unions 22 into the walls of the cup, every trace of the liquid being then removed without contamination.

The body 1 of the nozzle slides freely in a fixing collar consisting of two parts 24–25 (FIG. 5), provided with a sliding ring 26 of a self-lubricating material, for example polytetrafluoroethylene. The parts 24 and 25 are pivoted at the hingle 27 and the locking thereof is effected by a clamp 28 controlled, for example, by a handle 29 permitting a quick release. The position of the nozzle 1, is controlled by a fork 30, having rollers 31 positioned on either side of the body of the nozzle between the shoulders 2 and 3. Clamp 24, 25 is fixed rigidly to a support 23, which can oscillate from left to right under the action of a fluid pressure operated jack 32 fixed at one end to the support 23 by a pivot 33 and at the other end, by its rod 34, on an arm 35 at the pivot point 36. The arm 35 is pivoted to the support 23 and to a fixed frame 37 of the machine by pivots 38 and 39, and forms a parallelogram linkage with a similar arm 40. The movements imparted to this parallelogram by the action of the jack 32 thus permit the nozzle 1 to be moved from above the mould 41 rearwardly to a point above the cleaning cup 21. The arms 35 and 40 are mounted in pairs on each side of the section members forming the support 33 and the frame 37, so as to constitute a non-deformable unit.

Fixed to the support 23 is a fluid pressure operated jack 42, the rod of which is connected by a bell-crank 43, pivoted at 44, to the fork 30, controlling the upward and downward movement of the nozzle. A further jack 45 on support 23, operates through a rocker 46, pivoted at 47 at nozzle 1, to operate the push-rod 7 to effect the opening or closing the end valve of the nozzle.

The arrangement of the jack 45 is such that when the nozzle 1 is raised, the jack does not act on the rocker 46, which is spaced too far therefrom, and this prevents opening of the valve 12, when the nozzle is not in position on the mould, since such opening would flood the machine.

In operation, the mould 41, having just received a parison from the extruder, is displaced on an endless or circular chain track, together with the frame 37. The nozzle 1 descends on to this mould under the action of the jack 42 and air is blown in at 5 into the nozzle and inflates the parison. Then, in order to accelerate the cycle, the pressure is cut off and simultaneously broken in the mould by a suction produced by the conduit 6 through the nozzle.

The filling is then effected immediately by opening the valve of the nozzle under the action of the jack 45 and the push-rod 7, the liquid arriving by way of the conduit 4. The connections of 4, 5 and 6 to the different fluid conduits will preferably be made by quick-action connections to facilitate disconnection.

The filling contributes to the very rapid cooling of the bottle, due to the fact that the liquid is distributed on to the walls of the latter, because of the conical form 12 (FIG. 4) of the nozzle valve.

The suction effect, produced by the conduit 6, then ensures the extraction of froth and filling to the correct level, which depends on the position of the push-rod 7, the ampltiude of travel of which is adjustable.

The valve 12 is then closed by return of the jack 45 and the action of the spring 8 on the push-rod 7, and the nozzle is raised by the jack 42. A slight suction then avoids the formation of drops whilst simultaneously a slight blowing effect, maintained throughout the entire operation, prevents upward movement of liquid in the blowing conduit.

The jack 32, then rocks the entire assembly rearwardly to disengage the mould. The nozzle, forced downwardly again by the jack 42, can then be introduced into the cup 21 for drying with sterile air.

It will be seen that the arrangement according to the invention makes it possible to ensure, by means of a single member, the blowing, filling and the setting of a precise level of bottles, because the latter are positioned in rigid moulds, this taking place under suitable sterile conditions, while ensuring an efficient removal of froth and residual drops which are sources of pollution. In addition, it can be very quickly and simply detached, this permitting its easy replacement, for example, for sterilization.

Being perfectly adapted to the filling of liquid foods, this arrangement is suitable for any operation which requires conditions of particular care, for example, when working in an inert atmosphere during the filling, or any similar operation.

The operating cycle and the details regarding the mounting of the nozzle support can be different from that described. For example, it is possible to conceive a mounting on an arm which turns and is no longer oscillating on the parallelogram linkage. The support 23 will then be mounted for rotational movement on a vertical or horizontal pivot on the frame 37, for example, and the jack 32 fixed on one side on the frame 37 will act on the other in a horizontal or vertical plane on a pivot placed on the support 23 at some distance from the vertical or horizontal pivot as thus defined. The support of the nozzle could alternatively be mounted on slides ensuring the displacement of the nozzle by a simple translatory movement, either by a telescopic device, or by rolling on guide rollers permitting the same relative displacements with respect to the mould and the same working cycle.

I claim:

1. In a blow extrusion apparatus, a blowing nozzle comprising, in combination:
    (a) an external tubular body;
    (b) an open lower end to said body;
    (c) a tubular element mounted coaxially within said tubular body;
    (d) a passage defined between said tubular element and external tubular body;
    (e) a longitudinal partition dividing said tubular element to form two channels;
    (f) open lower ends to each of said channels;
    (g) means connecting said passage to a source of liquid;
    (h) means connecting one of said channels to a source of compressed air;
    (i) means connecting the other of said channels to a suction source;
    (j) means for moving said element axially relative to said external tubular body, between a lowered position and a raised position; and
    (k) seal means on said tubular element effective to seal said open lower end of said tubular body when said tubular element is in the raised position, effective to close said passage.

2. The blowing nozzle defined in claim 1, wherein said open lower end of said tubular body defines a downwardly divergent frustoconical orifice and wherein said seal means comprises a conically flared skirt at said lower end of said tubular element.

3. The blowing nozzle defined in claim 1, wherein said channels are formed by an inner and an outer coaxial tubular element.

4. The blowing nozzle defined in claim 3, wherein said open lower ends of said inner and outer tubular elements are connected by an annular mesh grid.

5. The blowing nozzle defined in claim 1, wherein said external tubular body is mounted in a mounting-sleeve for vertical movement and drive means are provided for moving said external tubular body between an elevated position and a lower position.

6. The blowing nozzle defined in claim 5, wherein said means for moving said element axially relative to said body includes positive force applying means for lowering said elements and resilient means for raising said element.

7. The blowing nozzle defined in claim 6, and including a linkage between said positive force applying means and said element effective to render said force applying means inoperative on said element except when said external tubular body is in the said lower position.

8. The blowing nozzle defined in claim 5, and including means for moving said mounting sleeve horizontally.

9. The blowing nozzle defined in claim 8, and including a frame, a support carrying said mounting sleeve, a parallelogram linkage between said frame and support and fluid pressure operated piston means connected to said linkage effective to rock said support relative to said frame.

References Cited

UNITED STATES PATENTS

| | | | |
|---|---|---|---|
| 3,196,592 | 7/1965 | Cheney | 18—5 |
| 3,311,949 | 4/1967 | Moran | 18—5 |
| 3,327,035 | 6/1967 | Parfrey | 18—5 |

WILBUR L. McBAY, Primary Examiner

U.S. Cl. X.R.

53—140